March 30, 1926.
W. HAMAN
1,578,431
HAY STACKING DEVICE
Filed Feb. 14, 1925     3 Sheets-Sheet 2
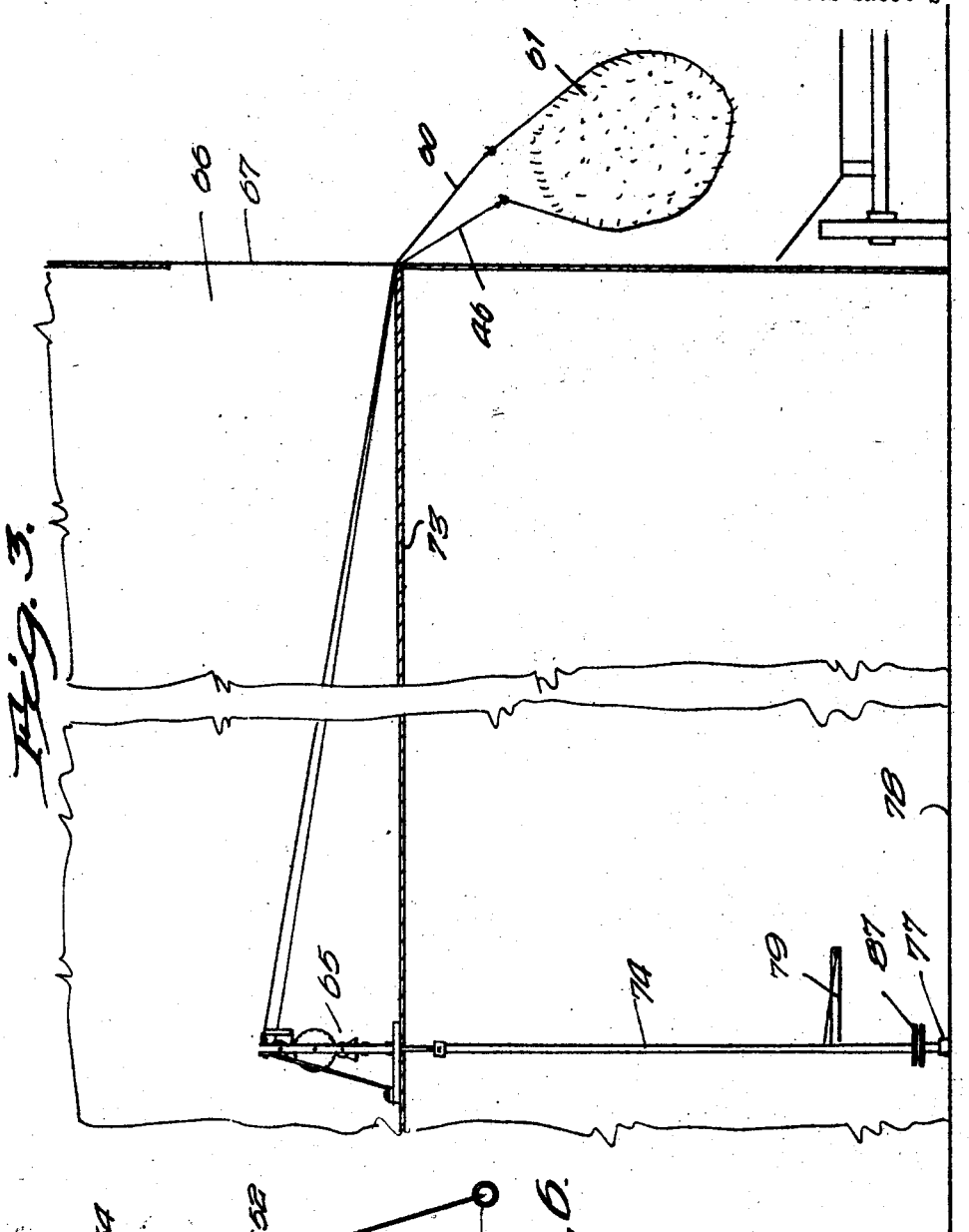
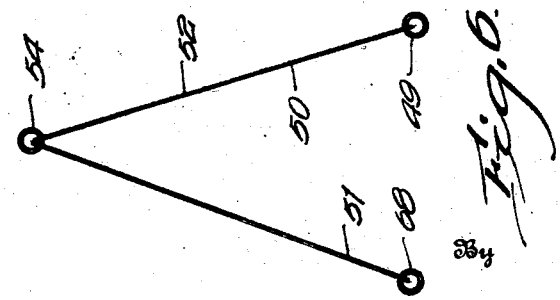

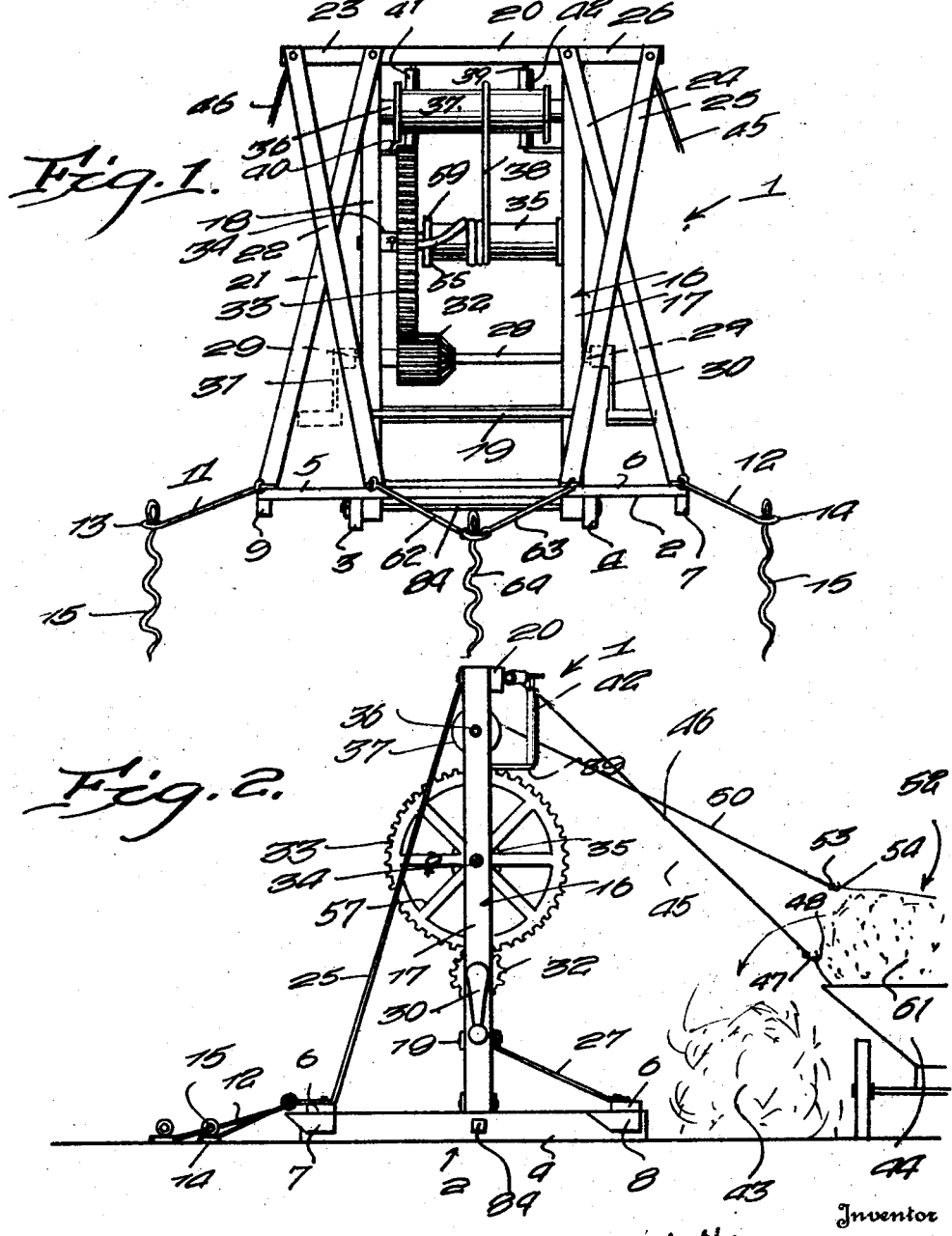

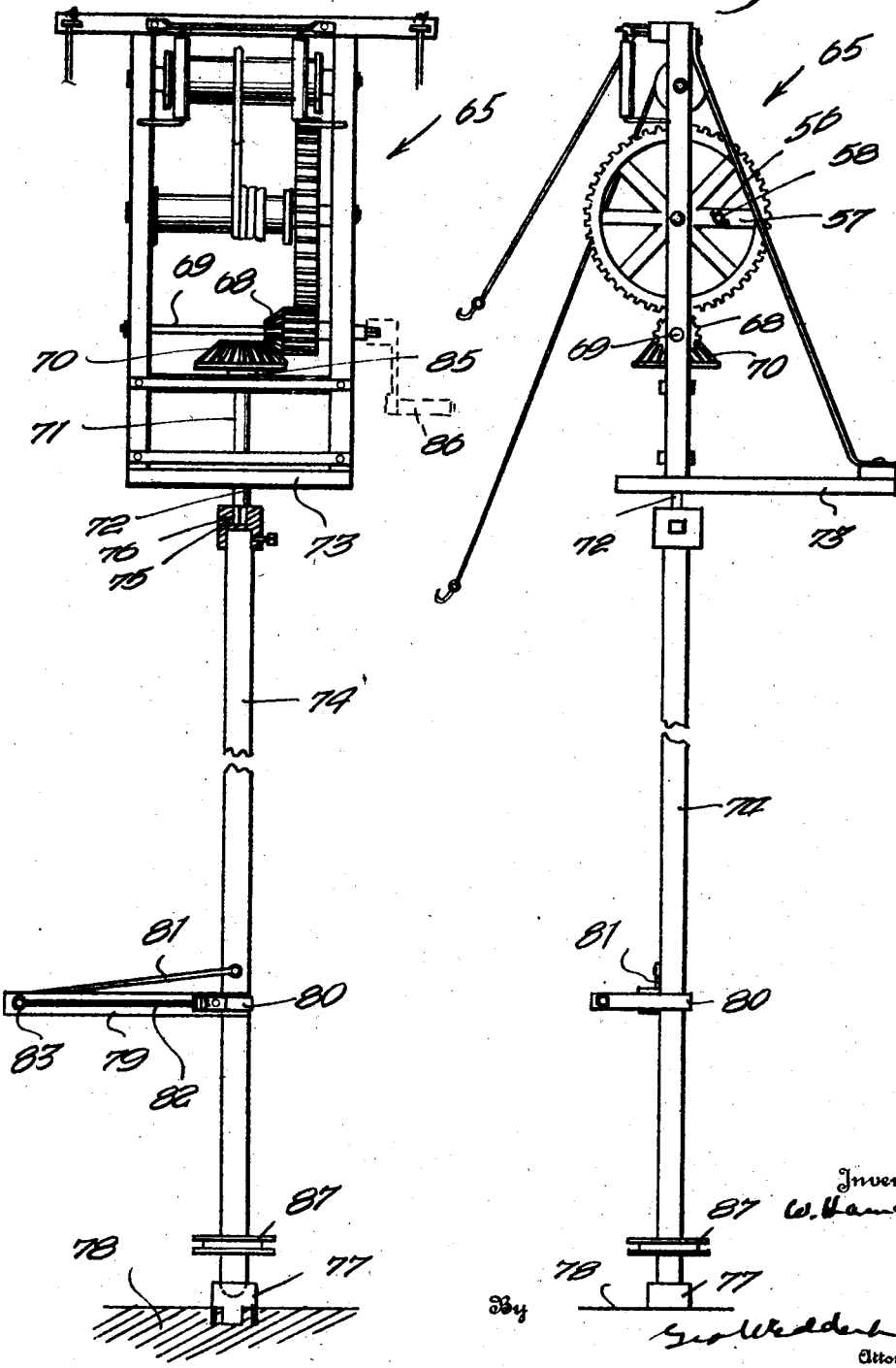

Patented Mar. 30, 1926.

1,578,431

UNITED STATES PATENT OFFICE.

WENDELIN HAMAN, OF BERWICK, NORTH DAKOTA.

HAY-STACKING DEVICE.

Application filed February 14, 1925. Serial No. 9,098.

*To all whom it may concern:*

Be it known that I, WENDELIN HAMAN, a citizen of the United States, residing at Berwick, in the county of McHenry and State of North Dakota, have invented certain new and useful Improvements in Hay-Stacking Devices, of which the following is a specification.

This invention relates to improvements in hay stacking devices, and has for its object to provide a simply constructed inexpensive stacker for use either in the field or in the barn.

Another object of the invention is to provide a hay stacking machine so constructed that an entire load of hay may be lifted in one portion from the wagon and placed upon the stack.

A still further object of the invention is to provide a hay stacking device mounted upon runners whereby it may be readily transferred from one section of a rick to another section.

A still further object of the invention is to provide a hay unloading device which may be operated either manually or by horse or other power entirely within a barn.

With the above and other objects in view, I have invented the device illustrated in the accompanying drawings, in which:

Figure 1 is a front elevational view of my device.

Figure 2 is a side elevational view thereof.

Figure 3 is a sectional view taken through a barn, embodying a modified form of the invention.

Figure 4 is a front elevational view of the modification.

Figure 5 is a side elevational view thereof.

Figure 6 is a plan view of a sling.

Like reference characters indicate like parts throughout the following specification and in the several views in the drawings, in which 1 is a hay stacking device embracing a base 2 mounted upon runners 3 and 4. Members 5 and 6 of the base project beyond on each side the runners 3 and 4 and are provided with skids 7, 8, 9, and 10, which are adapted to engage and slide upon the ground in case of tilting of the machine in moving the same, to prevent the toppling over thereof. Pivotally secured to the front bar member 6 are braces 11 and 12 terminating in eyes 13 and 14, through which anchor screws 15 are projected and run into the ground in order to securely anchor the device and prevent its upturning when lifting a load. Mounted between the runners 3 and 4 is an upright framework 16 embracing vertical bars 17 and 18, spaced apart by brace members 19 at its lower portion and 20 at the top thereof, the latter bar extending beyond the uprights 17 and 18 on each side. Brace straps 21 and 22 which are fixed to the projecting end 23 of the member 20 at one end cross each other and are secured to the member 6 at their lower ends, similar brace straps 24 and 25 connecting the projecting end 26 of said member 20 and the member 6, whereby the upright frame work 16 is securely braced and maintained in its upright position when taken in connection with the braces 27 on the opposite side of the member 16. Mounted in the uprights 17 and 18 is a shaft 28 having squared ends 29 upon which cranks 30 and 31 are mounted. Also mounted upon the shaft 28 is a pinion gear 32 which meshes with the large gear 33 mounted on the shaft 34, upon which shaft is also loosely mounted a drum 35. Mounted on the shaft 36 above the gear 33 is an idler drum 37, over which the rope 38 operates. Secured to the member 20 and the uprights 17 and 18 is a pair of brackets 39 and 40 which support spaced apart, guide rollers 41 and 42.

In operation, the stacker is anchored adjacent the place where the hay stack or rick 43 is to be formed. A wagon 44, embracing a hay frame with its load, is driven up to the outside of the stack 43, when the guide ropes 45 and 46, through their terminal hooks 47 are secured to the rings 48 and 49 attached to the ends 50 and 51 of the sling 52, after which the hook 53 is engaged with the center ring 54 of said sling, the end 55 of said rope being passed through the opening 56 in the sprocket 57 of the gear wheel 33, and secured in position by means of the clip 58, after which the operator rotates the shaft 28 by means of the crank handle 30, causing the rope 38 to bind upon the flange 59 of the drum 35, preventing the rotation thereof, the operation of the shaft 28 causing the rope 38 to wind upon the drum 35, causing the end 60 thereof to operate upon the sling 52 to draw the load of hay 61 from the wagon upon the stack being formed. As soon as this has been accomplished, the clip 58 is removed from the end 55 of the rope, whereby said end is permitted to release itself from the gear wheel 33, enabling the end 60 of the rope to be drawn freely over the pulleys to engage the sling of the next load. A pair of links 62 and 63 are pivoted to the bar 6 at one end and connected at the other end by a ring 64, to which a single- or double-tree may be attached for the purpose of hauling the machine from place to place or from one portion of a rick to another portion, where a rick instead of a stack is being formed.

In Figures 3, 4, and 5 is illustrated a modification of the invention, in which the stacker 65 is fixedly mounted in the upper story 66 of a barn 67. In this form of invention, a bevel gear 68 is mounted upon the shaft 69, which is in mesh with a bevel gear 70 mounted on the upper end of a vertical shaft 71, the lower end 72 of which projects beyond the floor 73 of the barn. An upright 74 having a squared socket 75 to cover the squared end 76 of the shaft end 72, is rotatably mounted upon a bearing 77 fixed in the lower floor 78 of said barn. A lever 79 is fixed by a bracket 80 to the upright 74, and is secured by braces 81 and 82. To the end of said lever a single- or double-tree may be attached at the eye 83, whereby a horse or team may be hooked to said lever in order that they may be driven around in a circle to rotate the upright 74 and operate the machine. In other respects, the device is similar to the form of Figure 1.

The uprights 17 and 18 are secured to the runners 3 and 4 by means of a screw rod 84. By removing this rod and the brace straps 21, 22, 24, 25 and 27, the device of the form of Figure 1 may be transferred to a barn to be used therein during the winter months, the shaft 71 and upright 74 being placed in position, the member 19 being provided with a vertical bore through which the shaft 71 may project and held therein by means of a clamp collar 85. It is to be understood that the shaft 69 may also be provided with a crank 86 in order that the device may be manually operated within the barn, if preferable to horse operation. It is also to be noted that a pulley 87 may be provided on the upright 74, or that the same may be rotated by means of a motor.

Having described my invention, that which I claim is new and desire to protect by Letters Patent is:

1. A stacking device including an upright, a series of horizontal shafts mounted thereon, a relatively large cog wheel fixed to one of said shafts, means for operating said wheel, and means whereby the rotation of the wheel will lift a load of hay from a wagon, the said means including a rope, one end of which is adapted to be removably attached to said cog wheel.

2. A stacking device including an upright, a series of horizontal shafts mounted thereon, a relatively large cog wheel fixed to one of said shafts, means for operating said wheel, and means whereby the rotation of the wheel will lift a load of hay from a wagon, the said means including a rope, one end of which is adapted to be removably attached to said cog wheel, and a drum loosely mounted on the shaft of said cog wheel upon which said rope is adapted to be wound.

3. A stacking device including an upright, a series of horizontal shafts mounted thereon, a relatively large cog wheel fixed to one of said shafts, means for operating said wheel, and means whereby the rotation of the wheel will lift a load of hay from a wagon, the said means including a rope, one end of which is adapted to be removably attached to said cog wheel, and a drum loosely mounted on the shaft of said cog wheel upon which said rope is adapted to be wound, said rope binding said drum when the wheel is operated in one direction to prevent rotation of the drum.

4. A stacking device including an upright, a series of horizontal shafts mounted thereon, a relatively large cog wheel fixed to one of said shafts, means for operating said wheel, and means whereby the rotation of the wheel will lift a load of hay from a wagon, the said means including a rope, one end of which is adapted to be removably attached to said cog wheel, a drum loosely mounted on the shaft of said cog wheel, upon which said rope is adapted to be wound, said rope binding said drum when the wheel is operated in one direction to prevent rotation of the drum, and an idler drum over which said rope operates.

5. A stacking device including an upright, a series of horizontal shafts mounted thereon, a relatively large cog wheel fixed to one of said shafts, means for operating said wheel and means whereby the rotation of the wheel will lift a load of hay from a wagon, said means embracing one of said shafts and means whereby the latter shaft is rotated, said means consisting of a vertical shaft adapted to project through a barn floor, a rotatable upright fixed to said shaft and means whereby said upright may be rotated.

In testimony whereof I affix my signature.

WENDELIN HAMAN.